United States Patent Office 2,913,308

Patented Nov. 17, 1959

2,913,308

PROCESS FOR THE PRODUCTION OF HIGH STRENGTH LOW CONSISTENCY CALCINED GYPSUM

Manvel C. Dailey, Palo Alto, and Elmer S. Johnson, Arlington Heights, Calif., assignors to United States Gypsum Company, Chicago, Ill., a corporation of Illinois

No Drawing. Application July 7, 1953 Serial No. 366,606

4 Claims. (Cl. 23—122)

The present invention relates to an improved form of calcined gypsum having new and valuable physical properties, particularly a low consistency and a very high strength.

Ordinarily calcined gypsum, known under various names, such as stucco, plaster of Paris, molding plaster, and the like, consists primarily of the hemihydrate of calcium sulfate, $CaSO_4 \cdot \frac{1}{2}H_2O$. This material is capable of being reconverted into calcium sulfate dihydrate by mixing it with an excess of water. The hemihydrate will combine with sufficient water to reform the dihydrate thereby forming a super-saturated solution thereof which is crystallized out in the form of long slim interlaced gypsum crystals, forming what is known as a set gypsum mass. However, most of the ordinary types of commercial calcined gypsum products will not pack very closely even though the material be very finely powdered.

As a concomitant of this lack of packing and the surface characteristics of the crystals a large quantity of water is required for converting such types of calcined gypsum into a slurry sufficiently pourable to be cast into molds. Upon the final setting of the product this excess water will, of course, have to be evaporated, leaving empty spaces behind, which greatly impairs the strength of the resulting article and is particularly noticeable when the material is tested for compressive strength.

If, on the other hand, the calcined gypsum, particularly the hemihydrate, could be produced in the form of short squat and almost cubical crystals having a much lower surface area, it will be self-evident that such a material would inherently require a great deal less water to wet the surface of the individual crystal particles thereof to convert it into a pourable slurry.

It has become the custom in the gypsum industry to describe the amount of water, expressed in cubic centimeters or grams, required to be added to 100 grams of calcined gypsum to produce a slurry which will just barely pour from a cup, as the consistency of the plaster, this usually being expressed by merely a number, it being understood, however, that the number means cubic centimeters or grams of water per 100 grams of product.

For many years various additives had been admixed with calcined gypsum for the purpose of producing a lower consistency than that which is characteristic of most kettle-calcined gypsum products. Such ordinary kettle-calcined gypsums ordinarily have a consistency of around 65 to 72 and a corresponding low strength in the finished dried set article.

The first commercially successful means of obtaining a calcined gypsum having a low consistency, and therefore a correspondingly high strength, was the process of Randel and Dailey, which was covered by United States Patent No. 1,901,051. This Randel and Dailey method involved the heating of lumps of raw gypsum rock under steam pressure at about from 15 to 17 pounds per square inch gauge for about six hours, whereafter the resulting lumps were dried without cooling and then ground. It was necessary to dry them at a high temperature to avoid their reconversion into the dihydrate. By using such a method a product was obtained which would have a consistency of about 40 to 42 per 100 grams of the calcined gypsum. Using exactly the same raw materials, but calcining under atmospheric conditions in the manner ordinarily used, such as in kettle calciners or rotary calciners, a product having a consistency of about 70 would be obtained.

It is one of the objects of the present invention to prepare calcined gypsum having a consistency from about 27 to 32, which, when gauged with an amount of water equivalent to the consistency, will have, after setting and drying, a compressive strength of about 10,000 pounds per square inch. This is to be compared with a material having a compressive strength of about from 3000 to 5750 pounds per square inch for that described in Patent 1,901,051; in other words, the calcined gypsum of the present invention is just about twice as strong as that of Randel and Dailey, and has a very much lower consistency.

It is a further object of the present invention to disclose a process for the manufacture of such a product.

Another object of the present invention is to disclose the improvement in the washing and drying of gypsum which has been calcined to the hemihydrate state and which, at least for a portion of the calcining operation, had been suspended in an aqueous solution as herein more fully described.

Various other objects of the invention will readily occur to those skilled in the art of which this invention is a part.

It has been found that calcined gypsum, having a consistency as low as 27, and possibly even somewhat lower, may be obtained by subjecting gypsum in a particular state of sub-division, and without agitation, to heat under pressure while submerged for a definite period of time in an aqueous solution of a dicarboxylic organic acid compound, such as succinic acid and its soluble salts.

It was found that in order to obtain the desirable results flowing from the practice of the present invention it was critical to employ gypsum in the form of particles of a size which could be as large as ½" in diameter, but in any event which were too large to pass through a 20 mesh sieve. By using particles larger than 20 mesh size, there are many production advantages, one of the most outstanding of which is that the process may be carried out in simple apparatus, of the general type as shown in Jessen Patent 2,383,254.

It was found that the properties of the product could be even further enhanced by first cooking the particulate gypsum of the size hereinabove indicated in a solution containing from about 0.05% and upwardly of succinic acid or a water-soluble succinic acid salt, whereafter the solution could be withdrawn from the particulate partly converted gypsum and the calcination continued under steam pressure at from 15 to 35 pounds per square inch gauge pressure until the desired short squat gypsum crystals were obtained.

It was further found that the process could also be carried out at a somewhat increased rate of speed if a certain amount, say about 0.05% or upwardly, of fumaric acid or a soluble fumarate were also present. In this respect the present invention bears some similarity to the process described in the United States patent to C. L. Haddon 2,448,218, in which there is described a process for the production of plaster of Paris which involves mixing gypsum, ground to a fineness of from 20 to 80 mesh, with water, hydrated lime and either citric or succinic acid, agitating the resulting very fluid mixture and heating it in an autoclave with continued agitation to a temperature of from about 125° C. to about 160° C. According to this Haddon patent, however, the agitation is considered to be quite necessary, for if the product be not agitated there would be primarily produced the anhydrous form of calcium sulfate, it being stated in the said patent that if the contents of the autoclave are well stirred, the product then consists for the most part of hemihydrate crystals of a squat shape.

By the process of the present invention, however, where stirring is avoided, and care is taken not to employ gypsum having a smaller size than 20 mesh, not only is agitation unnecessary, but also the undesired formation of the soluble anhydrite form of calcium sulfate will be avoided, as contended in the specification of the Haddon patent.

A further particular advantage in using the gypsum in rather coarse particulate form lies in the fact that it is thus possible to interrupt the operation by merely draining from the containers in which the process is carried out the solution of the acid or its salts, and then to continue the calcination merely with steam pressure. Such steam as incidentally then condenses upon the particulate gypsum will tend to wash the particles.

It is, however, to be understood that the steam calcination phase is not absolutely essential, as a very satisfactory product may be obtained merely by cooking the particulate gypsum in the solution of either succinic acid or of its salts, with or without the further addition of fumaric acid or its salts. Among the salts suitable for this purpose are the alkali salts, including also ammonium salts, that is to say, either the succinates or fumarates of sodium, potassium, ammonium, etc. The product when properly prepared will have a consistency of between about 27 and 36 cubic centimeters per 100 grams of the hemihydrate, and the compressive strength will be on the order of about 10,000 per square inch and even higher.

This strength will be attained without the addition of any strength-increasing materials such as, for example, the melamine resins, which have been used in comparatively large amounts to produce gypsum products having such high strength. The present product, however, is to be differentiated from these admixed gypsum products in that the material itself has a neat compressive strength after setting and drying at normal consistency of about 10,000 pounds per square inch.

*Example I*

Gypsum rock is crushed and screened so as to produce a fraction having lumps up to about ½" in size, and particles which will all be retained on a 20 mesh sieve; in other words, anything which passes through a 20 mesh sieve is discarded. The coarser material therefore, which for the purpose of the present invention will be designated as particulate gypsum, is then placed in an autoclave and submerged in a very dilute solution of potassium succinate which may be run into the autoclave either cold or preheated. The autoclave is then closed and the contents thereof heated by any suitable means so as to develop a pressure of from about 15 to 25 pounds per square inch gauge pressure, which corresponds to a temperature of about from 121° C. to 130.3° C. (250° F. to 267° F.).

This heating under pressure and while submerged in the solution is continued for about from 3 to 7 hours. The strength of the succinic acid or succinate solution is on the order of about 0.05% on the weight of the water and can be as high as 0.25% by weight. Even larger amounts may be used but it has not been found to be advantageous and the cost would, of course, be correspondingly increased. For most practical purposes a solution of a strength of about 0.05% was found to be adequate.

At the end of from 3 to 7 hours of such heating the solution is drained from the bottom of the autoclave, the bottom being provided with a suitable screen to keep the particulate gypsum from leaving with the solution, or the gypsum particles may have been contained in a screen basket.

After the solution has been withdrawn, steam is then introduced into the autoclave until a pressure of between about from 17 to about 35 pounds per square inch is obtained, and the operation is continued for from 1 to 3 hours. As already mentioned, sufficient water condenses from the steam to act as a washing medium for the gypsum particles.

At the end of the operation the steam is blown from the autoclave whereafter the autoclave is opened and the product removed therefrom and quickly dried without allowing it to fall to a temperature at which rehydration would take place. The resulting particles or lumps are then ground in a suitable mill such as a buhr mill or a hammer mill to form fine particles. It is highly desirable to avoid the formation of too many fines. In other words, the ground product should have as nearly a uniform particle size as possible. This particle size can best be expressed in the terms of Blaine surface area which can be determined in accordance with a well established method, namely "Tentative Method of Test for the Fines of Portland Cement by Air Permeability Apparatus," known as ASTM designation C204–46T, accepted January 24, 1946, and published in 1946 ASTM Standards, Part II, pages 1290 to 1296. A product having a Blaine surface area factor or coefficient of from about 1700 to 3500 square centimeters per gram yielded a product having a consistency of from about 27 to about 36 and a compressive strength of about 10,000 pounds per square inch. Compared with the product of Patent 1,901,051, the latter was found to have had a consistency of 41 cc., a Blaine surface area of 4000 square centimeters per gram, and a compressive strength of only about 6500 pounds per square inch. It has been found that the time factor of the first step of the calcination, that is, the boiling in the acid solution, could be reduced if about 0.05% of fumaric acid or of its alkali metal or ammonium salt were also present. If the calcination has been properly carried out it will be found that the resulting gypsum lumps or particles are granular in nature and may be readily disintegrated into fragments of small stubby crystals.

If fine grinding is preferred, it is very important to keep the formation of fines to a very minimum, for which a buhr stone or hammer mill may be used, particularly one of the type which is air-swept so as to remove the ultra fine material during the grinding operation.

It is again to be emphasized that the Blaine coefficient of the resulting ultimate powdered product should be as low as possible, for only in that way will one obtain the desired extremely low consistency. It is quite possible to buhr grind to a fineness of from 90% to 98% through 100 mesh followed by tube milling for a short time in order to improve the plasticity of the product. In general the Blaine coefficient of the desired product should not exceed about 3500 square centimeters per gram.

Consideration must, however, be given to the plasticity of the material, and this can be attained by the ball-milling. Such ball-milling will increase the Blaine coefficient, and therefore a reasonable balance between low Blaine coefficient and the desirable plasticity must be maintained. Too much ball-milling will tend to increase the low consistency and therefore partially defeat the benefits of the present method of calcination, so only sufficient plasticity should be induced in the material to satisfy user demands without unduly increasing the amount of super-fines in the product, which is reflected in an increased Blaine efficient.

While the operating range during the first or cooking step has been given as being from 15 to 25 pounds per square inch gauge, corresponding to a non-superheated steam temperature or from 250 to about 267° F. it is preferred to operate at the rather close range of from 20 to 22 pounds. It is possible to start out at the lower pressure and gradually increase it after the crystals have first formed until a pressure even as high as 35 pounds per square inch has been reached.

The length of time required can readily be determined after a few preliminary experiments with a given supply of raw gypsum. While the operation is from 3 to 7 hours during the first step, it is advantageous at the end of three hours to withdraw a sample and to test it to determine the degree of conversion, and if there has been a sufficient conversion, to stop the operation at that time; the same thing therefore can also be done during the second or steam pressure calcination step. As aforementioned, the effective range of the first step as to time factor is from about 3 to 7 hours and in the second step or steaming stage of from about 1 to 3 hours.

*Example II*

The same type of procedure was followed as in Example I, but instead of using potassium succinate, there was used 0.24% by weight of free succinic acid, calcining in the solution for six and one-half hours at 21 pounds per square inch, followed by steam calcination at the same pressure for one hour. The resulting material was dried for one hour at 300° F., and buhr ground at 196° F., and thereafter ball-milled for twenty to forty minutes. The Blaine coefficient was about 2330 square inches per gram, the consistency was 32, and the compressive strength was close to 10,000 pounds per square inch.

*Example III*

Following the same procedure, but using a mixture of potassium succinate and potassium fumarate (0.12% of each), and calcining for five and one-half hours at 22 pounds in the solution and about one hour in steam at the same pressure, dried at 300° F., buhr-ground as before and then ball-milled for forty minutes, the product obtained had a Blaine coefficient of 2640, a consistency of 32, and a compressive strength of about 10,000.

The succinic acid, fumaric acid, or their salts function as crystal-growth inhibitors and they may therefore be thus broadly characterized.

No particular apparatus is required to be illustrated as the product can be prepared in ordinary autoclaves which need not be equipped with any stirrers or agitators, as in fact apparatus such as that mentioned in the patent already referred to may well be used, for which reason no drawing accompanies the present specification.

Such equivalents as will readily suggest themselves to those skilled in this art are to be construed as within the scope and purview of the present invention.

The important point to be kept in mind is the fact that the process be carried out with the material in particulate form of a size so large that none of it will pass a 20 mesh screen, and also that agitation is avoided during the calcining operation, that is, both during the boiling as well as the steaming stages.

Applicants claim:

1. A process of producing calcined gypsum characterized by a very low consistency when gauged with water which comprises heating particles of gypsum, of such a size that they will not pass through a 20 mesh screen, in an aqueous solution containing at least about 0.05% by weight of a water-soluble, poly-carboxylic organic compound from the group consisting of succinic acid and its water-soluble alkali salts, and a mixture of succinic and fumaric acids and their water-soluble alkali salts, under superatmospheric steam pressure within a range of from about 15 to about 25 pounds per square inch gauge pressure and in a state of quiescence, for a period of from about three to seven hours, removing the solution from contact with the gypsum particles, and then heating the later in an atmosphere of steam at a pressure of from about 15 to about 35 pounds per square inch and at a temperature of from about 250 to about 290° F. for a time sufficient to complete formation of small stubby crystals of calcined gypsum, removing the formed crystals from the steam environment and drying them at a temperature above that at which reconversion to gypsum would take place, and grinding the resulting product.

2. Process of producing a form of calcium sulfate hemihydrate having, when gauged with water, a pouring consistency of from about 27 to about 36 cubic centimeters per 100 grams of said hemihydrate, which comprises comminuting gypsum to a particle size within the range of from about ½ inch in diameter to not exceeding about 20 mesh, submerging the particles in an aqueous solution containing from about 0.05% to about 0.25% by weight of a dicarboxylic organic compound selected from the group consisting of succinic acid and its water-soluble alkali salts, and a mixture of succinic and fumaric acids and their water-soluble alkali salts and heating it therein in a state of quiescence under superatmospheric pressure at from about 250° F. to about 267° F. for a period of from about three to seven hours until partial calcination of said gypsum takes place, then removing the solution from contact with the partially calcined gypsum and heating the latter with steam under a pressure of from about 15 to about 35 pounds per square inch until small stubby calcium sulfate hemihydrate crystals have formed, condensed steam washing said gypsum particles during said steam-heating operation, drying the resulting product at a temperature above that at which re-hydration to gypsum would take place, and grinding the resulting product to a powder having a Blaine coefficient below about 3500 square centimeters per gram.

3. The process as defined in claim 2 in which the compound is the potassium salt of succinic acid.

4. The process as defined in claim 2 in which the compound comprises both succinic as well as fumaric acid salts.

References Cited in the file of this patent

UNITED STATES PATENTS

| | | |
|---|---|---|
| 1,463,913 | Stuart et al. | Aug. 7, 1923 |
| 1,901,051 | Randel | Mar. 14, 1933 |
| 2,448,218 | Haddon | Aug. 31, 1948 |
| 2,616,789 | Hoggatt | Nov. 4, 1952 |